April 18, 1950     B. G. TREMBLAY     2,504,906
COMPOSITE METAL ELECTRIC CONTACT MEMBER Filed Aug. 10, 1945

WITNESSES:

INVENTOR
Bernard G. Tremblay.
BY
ATTORNEY

Patented Apr. 18, 1950

2,504,906

UNITED STATES PATENT OFFICE 2,504,906

COMPOSITE METAL ELECTRIC CONTACT MEMBER

Bernard G. Tremblay, Wilkinsburg, Pa., assignor to Westinghouse Electric Corporation, East Pittsburgh, Pa., a corporation of Pennsylvania Application August 10, 1945, Serial No. 610,075

12 Claims. (Cl. 200—166)

This invention relates to the surface treatment of intimate mixtures or alloys of refractory substances and good conducting metals. In particular, the invention relates to the treatment of such intimate mixtures for alloys in order to remove the refractory component from the surface of the body of mixture or alloy.

This application is a continuation in part of my copending patent application Serial No. 518,216 filed January 14, 1944, now abandoned, entitled "Treatment of metals."

Alloys or mixtures of a refractory metal with a conducting metal are prepared in order to produce members partaking of certain of the desirable properties of each of the components. Electrical contact members have been produced in large numbers by combining a good conducting metal such as copper, silver, or gold with a more refractory substance such as tungsten, molybdenum or tungsten carbide. Members so prepared possess many of the electrical and thermal conducting properties of the copper, silver, or gold while the refractory metal imparts high temperature characteristics, non-weldability, and other features to the composite member.

It is sometimes required that the composite good conducting metal and refractory metal members possess certain surface properties which are not necessarily possessed by the intimate mixture or alloy. In contact members it is frequently required that the electrical contact drop at the surface be reduced to a minimum in order to provide for good operating characteristics in service. Furthermore, it is often desirable to electroplate a metal upon the surfaces of the composite members. It has been found in electroplating of metals on tungsten and molybdenum, even in the composite mixture or alloys, that it is extremely difficult to obtain an electroplated coating which will adhere satisfactorily.

The object of this invention is to provide for treating in a fused alkali metal nitrate composite members in which a good conducting metal is intimately mixed with a refractory metal in order to remove the refractory metal at and adjacent the surface of the composite member and leave only the good conducting metal at the surface.

A further object of the invention is to provide for removing the refractory metal from the surface of a composite member containing an intimate mixture of the refractory metal and a good conducting metal to facilitate electroplating on the surface thereof.

A still further object of the invention is to provide a composite contact member in which the main body is composed of an intimate mixture of a good conducting metal and a refractory metal and a surface thereof consists essentially of only good conducting metal.

Other objects of the invention will, in part, be obvious and will, in part, appear hereinafter. For a fuller understanding of the nature and objects of the invention, reference should be had to the following detailed description and drawing, in which.

Figure 1:
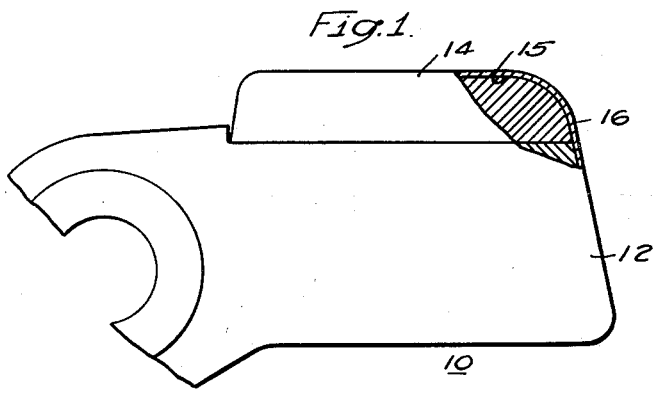
Figure 1 is an enlarged fragmentary view in elevation, partly in section, of a member produced in accordance with the invention.

According to the present invention, composite members in which a good conducting metal selected from the class consisting of silver, gold, and copper, is intimately mixed with a refractory substance or metal selected from the group consisting of tungsten, molybdenum and tungsten carbide, is treated in a molten or fused alkali metal nitrite whereby the refractory substance or metal at the surface of the composite member is removed leaving a surface composed of essentially good conducting metal.

It is an unexpected characteristic of the fused or molten alkali metal nitrites that they will dissolve and remove the refractory metals or substance to a substantial depth of the surface of the composite members without significantly dissolving or adversely affecting the good conducting metal.

The composite members to be treated may be prepared in various ways. For example, tungsten powder may be admixed into a molten silver, copper, or gold bath and the mixture cast into a suitable shape. In other cases, powdered good conducting metal and powdered refractory metal are mixed and compacted under pressure and then the compact is sintered to produce a composite member. It is believed that some alloying takes place during heat treatment. However, the action of the fused alkali metal nitrite appears to dissolve out the refractory metal whether it is mechanically mixed or alloyed with the good conducting metal. Composite mixtures of the good conducting metal and the refractory metal may be prepared in various proportions. Thus, tungsten has been associated with silver in proportions of only a few per cent of silver to 50% of silver and higher. Copper and tungsten have been associated in about the same proportions as silver and tungsten. Mixtures of tungsten and tungsten carbide with silver or copper have been prepared over a wide range of proportions thereof, usually the tungsten carbide constituting a small proportion of the composite member. Silver has been combined with tungsten carbide as the major ingredient of the mixture. Molybdenum and silver have been associated over a wide range of proportions: for example, from only a few per cent of silver to 40% of silver and even higher. Gold has been associated with both tungsten and molybdenum over a wide range of proportions. No matter what the mixture is with respect to the number of components or the proportions of such components, it has been found that the refractory metals or substances selected from the group tungsten, molybdenum and tungsten carbide may be satisfactorily removed from the composite members by the process of the invention.

A suitable process for treating the composite members is as follows: The member to be treated is heated to approximately 325° C. and immersed in a fused or molten sodium or potassium nitrite. One or two minutes immersion is ordinarily satisfactory to remove the tungsten, molybdenum or tungsten carbide at an exposed surface to produce a surface layer of essentially only good conducting metal for a depth of a few thousandths of an inch. It is not necessary to preheat the composite member prior to applying the molten alkali metal nitrite. The heating may be accomplished in the molten alkali metal nitrite bath itself though the process is much slower and cannot be controlled as readily if the composite members vary greatly in size, whereby the time required to heat them to the proper temperature may differ considerably. After treatment with the alkali metal nitrite, the member may be rinsed immediately in hot water or it may be allowed to cool to room temperature.

A slight oxide coating is often present, particularly on copper and silver surfaces as a result of heating to temperatures of about 300° C. Various selective solvents may be applied to remove this light oxide film. The silver oxide or copper oxide film may be readily removed by dipping the members in an aqueous alkali metal cyanide solution. A solution containing 5% to 10% of sodium or potassium cyanide will readily remove the silver or copper oxides without appreciably attacking the pure metal surface layer. While the alkali metal cyanide has been found to be most effective in removing the oxides of copper and silver, dilute acids, such as hydrochloric and sulphuric acid (5% or 10% concentration) may be applied to the treated composite member to remove the oxides. The member must not be allowed to remain too long in the acid, otherwise some of the silver or copper metal will be dissolved. A solution of ammonium hydroxide has been found to be effective in removing the silver and copper oxides without attacking the pure metal to any extent. The composite member after exposure to the solvent for the oxides is washed in water to remove the solvent.

The essentially pure good conducting metal surface on the treated composite member renders the member more satisfactory for many uses. Contact members and the like may be put into service at once with excellent results since the relatively pure copper or silver surface provides a low potential drop at the contact surface.

In many cases, however, it may be desirable to apply a coating of metal by electroplating the previously alkali nitrite treated composite member having a surface layer of only good conducting metal. Where the composite members have not been treated to remove the refractory metal component, they cannot be satisfactorily plated regardless of how well they are cleaned or otherwise treated. The present treatment removing the refractory metal component from the surface of composite members produces members that can be electroplated with excellent results. Thus, silver, copper, tin, or other metals may be plated directly upon the surface of pure silver, copper, or gold derived by the alkali metal nitrite treatment. The plated metal will adhere in a highly satisfactory manner as contrasted to the relatively poor adherence of a plating to a composite member, such, for example, as silver and tungsten.

Referring to Fig. 1 of the drawing, there is illustrated a contact arm 10 consisting of a body 12 of copper or other good conducting metal which is to be mounted in a circuit breaker or other electrical apparatus. The body 12 carries a composite member 14 composed of an intimate mixture of a good conducting metal and a refractory metal or substance. The member 14 may be attached to the body 12 by brazing, welding, or the like. After the composite member 14 has been brazed or otherwise attached to the body 12, it may be subjected to treatment in the fused alkali metal nitrite to remove the refractory metal from the surface, thereby leaving an essentially pure layer 15 of good conducting metal. Thereafter, the entire member may be electroplated with silver, copper, gold, tin, or other metal coating 16 in order to provide for surface appearance, corrosion resistance, or for other purposes.

Figure 2:
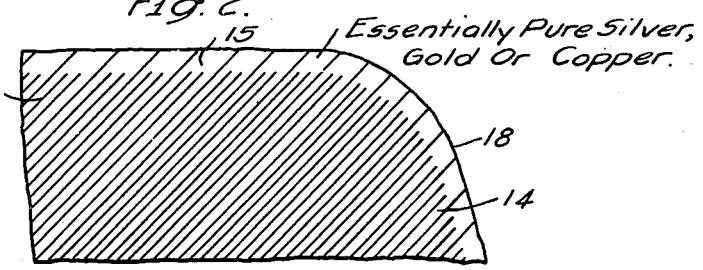
Fig. 2 is a greatly enlarged fragmentary cross section of a portion of a member similar to that of Fig. 1

Referring to Fig. 2 of the drawing, there is illustrated a greatly enlarged cross-sectional view of the composite body 14 showing its structure after treatment in the alkali metal nitrite. The body 14 is composed of an intimate mixture of silver, copper, or gold and a refractory metal, such as tungsten, molybdenum, or tungsten carbide. The nitrite treated surface layer 15 of the member is composed of essentially pure silver, copper, or gold as the case may be. The exterior surface 18 is somewhat porous and rough, but for many applications this is not detrimental.

Figure 3:
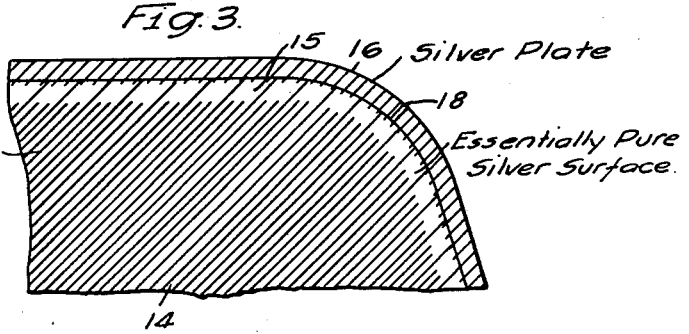
Fig. 3 is a greatly enlarged fragmentary cross section of Fig. 1.

In Fig. 3 of the drawing, there is illustrated a greatly enlarged cross-sectional view of a composite member 14 having the surface thereof treated in the alkali metal nitrite to remove the refractory metal and leaving an essentially pure good conducting metal surface layer 15. The good conducting metal is specifically designated as silver in Fig. 3.

Thereafter the composite member 14 was subjected to electroplating in a silver plating bath to deposit a silver plate 16 thereover. The relatively rough surface 18 produced by the etching action of the molten alkali metal nitrite provides for a good adherence of the silver plate 16 to the composite member 14. In practice, electroplated silver has been found to be so extremely adherent, that contact members of this invention have withstood the effects of both the electrical arcs and mechanical shocks of making and breaking electrical circuits without the plate disrupting or otherwise failing.

As an example of the advantages of the present invention, treated and untreated contact members consisting of 20% silver and 80% tungsten were prepared and compared by applying the indicated tests thereto in order to show the advantages of the treatment and alkali metal nitrite. One pair of the contact members was dipped in hydrochloric acid only and then silver plated. The following table is typical of actual results obtained in practice:

| | Method | Contact Drop-Multivolts at 250 Amperes |
|---|---|---|
| 1 | Acid dip and silver plate (new) | 21 |
| 2 | Acid dip and silver plate (1 month) | 47 |
| 3 | NaNO₂ dip without silver plate (new) | 11.5 |
| 4 | NaNO₂ dip without silver plate (1 month) | 12 |
| 5 | NaNO₂ dip and silverplated (new) | 12 |

As will be apparent from the above table, the contact drop does does not change significantly after one month for contact members treated according to the present invention as compared to an increase of more than double the contact drop after one month using a conventional process. During the month between tests, normal atmospheric corrosion was permitted to take place to oxidize and sulfidize the surface of the contact members.

It will be apparent that the invention may be modified in some cases in order to provide for predetermined requirements. The immersion in the alkali metal nitrite may be varied as to time depending on the depth of surface from which the tungsten is to be removed. The temperature of the nitrite bath should not be excessive since the nitrite will decompose above about 320° C. Therefore, the bath may require careful control to maintain it within a satisfactory range of operating temperatures.

After a composite member has been treated with the alkali metal nitrite, it may be used without any further treatment, or it may be subjected to electroplating as described herein, or burnishing, or other mechanical treatment to secure desired surface appearance. Various electroplates may be applied to the good conducting surface. If high contact drop metals are to be applied to a portion of a contact member for decorative purposes, it may be desirable to mask the treated contact face to prevent deposition of such metal thereon.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. In the process of treating a member in which a good conducting metal selected from the group consisting of silver, gold, and copper, is intimately mixed with a refractory metal selected from the group consisting of tungsten, molybdenum, and tungsten carbide, the step comprising applying a molten alkali metal nitrite to the surface of the member to dissolve the refractory metal at and adjacent the surface, the treatment leaving essentially only pure good conducting metal at the surface.

2. In the process of treating a member in which a good conducting metal selected from the group consisting of silver and copper is intimately mixed with a refractory metal selected from the group consisting of tungsten, molybdenum, and tungsten carbide, the steps comprising applying a molten alkali metal nitrite to the surface of the member to dissolve the refractory metal at and adjacent the surface, the treatment leaving essentially only pure good conducting metal at the surface, and applying a solvent for oxides of the good conducting metal to remove any such oxide to provide a clean surface of the good conducting metal.

3. In the process of treating a member in which a good conducting metal selected from the group consisting of silver and copper is intimately mixed with a refractory substance selected from the group consisting of tungsten, molybdenum, and tungsten carbide, the steps comprising applying a molten alkali metal nitrite to the surface of the member to dissolve the refractory substance at and adjacent the surface, the treatment leaving essentially pure good conducting metal at the surface, washing the member in water, and applying an aqueous alkali cyanide solution to the member to remove any oxide film to provide a clean surface of good conducting metal.

4. In the process of treating a member in which a good conducting metal selected from the group consisting of silver and copper is intimately mixed with a refractory substance selected from the group consisting of tungsten, molybdenum, and tungsten carbide, the steps comprising applying a molten alkali metal nitrite to the surface of the member to dissolve the refractory substance at and adjacent the surface, the treatment leaving essentially pure good conducting metal at the surface, applying a solvent for the oxides of the good conducting metal to remove any oxide that may be present, and electroplating the good conducting metal on the treated surface of the member.

5. A contact member comprising in combination, a body composed of a good conducting metal selected from the group consisting of silver gold and copper intimately mixed with a refractory substance selected from the group consisting of tungsten, molybdenum and tungsten carbide and an integral etched contact surface composed of the good conducting metal substantially free from the refractory substance to provide for low contact drop, the surface derived by removing the refractory substance therefrom by applying thereto a molten alkali metal nitrite for a period of time sufficient to dissolve the refractory substance at and adjacent the surface.

6. An electrical contact member comprising a body formed of a metal composition comprising a mixture of a good conducting metal selected from the group consisting of copper and silver and a refractory substance selected from the group consisting of tungsten, molybdenum and tungsten carbide, the body having an arcing surface portion, the arcing surface portion composed of an integral etched surface layer composed of only the good conducting metal substantially free from the refractory substance to a few thousandths of an inch to provide for low contact drop, the arcing surface portion being derived by removing the refractory substance by applying thereto a molten alkali metal nitrite for a period of time sufficient to dissolve the refractory substance at and adjacent the surface thereby providing the etched surface.

7. In a circuit breaker, a contact arm, an electrical contact member attached to the contact arm, the electrical contact member comprising a body formed of a metal composition comprising a mixture of a good conducting metal selected from the group consisting of copper and silver and a refractory substance selected from the group consisting of tungsten, molybdenum and tungsten carbide, the body having an arcing surface portion, the arcing surface portion composed of an integral etched surface layer composed of only the good conducting metal substantially free from the refractory substance to a few thousandths of an inch to provide for low contact drop, the arcing surface portion being derived by removing the refractory substance by applying thereto a molten alkali metal nitrite for a period of time sufficient to dissolve the refractory substance at and adjacent the surface thereby providing the etched surface.

8. In a circuit breaker, a contact arm, an electrical contact member attached to the contact arm, the electrical contact member comprising a body formed of a metal composition comprising a mixture of a good conducting metal selected from the group consisting of copper and silver and a refractory substance selected from the group consisting of tungsten, molybdenum and tungsten carbide, the body having an arcing surface portion, the arcing surface portion having an etched layer integral with the body and composed of only the good conducting metal minus said refractory substance and a superposed layer of a good conducting metal applied to said integral etched layer to give a low contact drop.

9. In a circuit breaker, a contact arm, an electrical contact member attached to the contact arm, the electrical contact member comprising a body formed of a metal composition comprising a mixture of a good conducting metal selected from the group consisting of copper and silver and a refractory substance selected from the group consisting of tungsten, molybdenum and tungsten carbide, the body having an arcing surface portion, the arcing surface portion having an etched layer integral with the body and composed on only the good conducting metal minus said refractory substance and a superposed electroplated layer of a good conducting metal applied to said integral etched layer to give a low contact drop.

10. In the process of providing an electrical contact member composed of a good conducting metal selected from the group consisting of silver, gold and copper intimately mixed with a refractory substance selected from the group consisting of tungsten, molybdenum and tungsten carbide with a contact surface having a low contact drop when electrical current passes through the contact surface, the step comprising applying a molten alkali metal nitrite only to the contact surface of the contact member to dissolve the refractory substance at and adjacent the contact surface, the treatment leaving essentially pure good conducting metal at the contact surface.

11. In the process of providing an electrical contact member composed of a good conducting metal selected from the group consisting of silver and copper intimately mixed with a refractory substance selected from the group consisting of tungsten, molybdenum and tungsten carbide with a contact surface having a low contact drop when electrical current passes through the contact surface, the step comprising applying a molten alkali metal nitrite to the contact surface of the contact member only to dissolve the refractory substance at and adjacent the surface, the treatment leaving essentially pure good conducting metal at the contact surface, and applying a solvent for oxides of the good conducting metal to remove any such oxide to provide a clean contact surface of the good conducting metal.

12. In the process of providing an electrical contact member composed of a good conducting metal selected from the group consisting of silver and copper intimately mixed with a refractory substance selected from the group consisting of tungsten, molybdenum and tungsten carbide with a contact surface having a low contact drop when electrical current passes through the contact surface, the step comprising applying a molten alkali metal nitrite only to the contact surface of the contact member to dissolve the refractory substance at and adjacent the surface, the treatment leaving essentially pure good conducting metal at the contact surface, applying a solvent for oxides of the good conducting metal to remove any such oxide to provide a clean contact surface of the good conducting metal, and electroplating a layer of the good conducting metal on the treated contact surface of the member.

BERNARD G. TREMBLAY.

REFERENCES CITED

The following references are of record in the file of this patent:

UNITED STATES PATENTS

| Number | Name | Date |
| --- | --- | --- |
| 87,422 | Sturdy | Mar. 2, 1869 |
| 549,736 | Montgomerie | Nov. 12, 1895 |
| 636,114 | Cain | Oct. 31, 1899 |
| 1,607,582 | Walker | Nov. 16, 1926 |
| 1,714,879 | Lang | May 28, 1929 |
| 2,299,000 | Allen | Oct. 13, 1942 |
| 2,390,595 | Larson | Dec. 11, 1945 |

OTHER REFERENCES

Mellor, "Inorganic and Theoretical Chemistry," volume 11, page 734, Longman's Green and Co., New York (1931). (Copy in Division 59.)